(12) United States Patent
Welch et al.

(10) Patent No.: US 9,683,454 B1
(45) Date of Patent: Jun. 20, 2017

(54) METHOD AND SYSTEM FOR MONITORING NON-ROTATING TURBOMACHINE PARTS (71) Applicant: General Electric Company, Schenectady, NY (US)

(72) Inventors: David Ernest Welch, Amsterdam, NY (US); Kristopher John Frutschy, Clifton Park, NY (US); Edward Leo Kudlacik, Glenville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/196,189

(22) Filed: Jun. 29, 2016

(51) Int. Cl.
*G01B 11/14* (2006.01)
*F01D 17/02* (2006.01)
*G01B 7/14* (2006.01)
*G01B 15/00* (2006.01)

(52) U.S. Cl.
CPC .............. *F01D 17/02* (2013.01); *G01B 7/14* (2013.01); *G01B 11/14* (2013.01); *G01B 15/00* (2013.01); *F05D 2270/804* (2013.01); *F05D 2270/821* (2013.01); *F05D 2300/17* (2013.01)

(58) Field of Classification Search
CPC .......... F01D 17/02; G01B 7/14; G01B 11/14; G01B 15/00; F05D 2270/804; F05D 2270/821; F05D 2300/17
See application file for complete search history.

(56) References Cited

U.S. PATENT DOCUMENTS

| | | | |
|---|---|---|---|
| 6,070,605 A | 6/2000 | Steenburgh | |
| 6,655,409 B1 | 12/2003 | Steenburgh et al. | |
| 6,868,366 B1 | 3/2005 | Eisenzopf | |
| 7,392,713 B2 | 7/2008 | Barkhoudarian | |
| 7,409,319 B2 | 8/2008 | Kant et al. | |
| 7,455,495 B2 | 11/2008 | Leogrande et al. | |
| 7,596,428 B2 | 9/2009 | Potdar et al. | |
| 8,042,412 B2 | 10/2011 | Xia et al. | |
| 8,522,820 B2 | 9/2013 | Biwanski et al. | |
| 8,876,460 B2 | 11/2014 | Willett, Jr. | |
| 8,985,143 B2 | 3/2015 | Forte, Jr. et al. | |
| 2007/0043497 A1* | 2/2007 | Leogrande | F01D 11/24 701/100 |
| 2009/0320609 A1* | 12/2009 | Xia | G01H 9/004 73/862.08 |
| 2015/0192456 A1 | 7/2015 | Deverell et al. | |

FOREIGN PATENT DOCUMENTS

CN 202188824 U 4/2012

* cited by examiner

*Primary Examiner* — Jamil Ahmed
(74) *Attorney, Agent, or Firm* — James W. Pemrick; Ernest G. Cusick; Frank A. Landgraff (57) ABSTRACT

A method for monitoring non-rotating turbomachine parts includes the step of measuring displacement of at least one turbomachine part. A monitoring step monitors displacement of the turbomachine part with a non-contact type sensor. A collecting step collects data regarding the displacement of the turbomachine part. An analyzing step analyzes the data to determine if the displacement exceeds a predetermined threshold range. The non-contact type sensor may be attached to the turbomachine by a rod formed of a material having a low coefficient of thermal expansion, and a target may be attached to a stationary structure in close proximity to the non-contact type sensor.

25 Claims, 6 Drawing Sheets

METHOD AND SYSTEM FOR MONITORING NON-ROTATING TURBOMACHINE PARTS

BACKGROUND OF THE INVENTION

The method and system described herein relates generally to turbomachines and, more specifically, to a method and system for monitoring non-rotating or stationary turbomachine parts.

Operation of a steam turbine may require application of valves that control fluid flow upstream of machinery. Typically, there are two types of main valves that control and protect a turbine, control valves and stop valves. Modern steam turbines typically employ valves that are combined control and stop valves, which operate in not only an open and closed mode, but also in intermediate positions as well. A combined control and stop valve includes a control valve having a control valve stem and control valve disk, and a stop valve having a stop valve stem and a stop valve disk. Both valves are assembled in one common pressure vessel and may share one seat. The control valve disk is positioned in relation to a valve seat, and is actuated to modulate or throttle fluid flow. The stop valve is situated within an opening located in the valve seat and is typically actuated in some situations to generally prevent turbine over speed.

Solid particle erosion (SPE) occurs within a turbine when solid particles are exfoliated off of turbine components such as, for example, boiler tubes and lead pipes. The exfoliated particles become entrained in the flow path. The particles are carried by high velocity flow paths located within the steam turbine. These flow paths may cause the particles to impinge against components located within the steam turbine at a relatively high velocity. For example, the particles may impinge against the stop valve stem located within the valve seat of the combined control and stop valve. The issue of particle impingement against the stop valve stem is further compounded with the fact that the valve seat tends to have a converging nozzle geometry that directs the particles towards the stop valve stem.

Excessive pipe loading during installation can result in vibration issues during commissioning of a steam turbine. Additional stress or vibration issues may be caused by vertical differential movement of the stationary components due to either excessive top to bottom thermal differential temperatures or from hot/cold position pipe loads acting on the stationary components. This movement of the stationary components can result in seal wear, permanent bowed rotors, and excessive vibration levels.

Steam turbines are often covered by a thick layer of insulation. The insulation is beneficial as it reduces heat transfer to the environment outside the turbine, and this increases machine efficiency. However, the thick insulation layer also makes it difficult to monitor the non-rotating/stationary components of the steam turbine, such as the steam turbine shell and the control/stop valves, as these stationary components may also be covered by the insulation layer.

BRIEF DESCRIPTION OF THE INVENTION

In an aspect of the present invention, a method for monitoring non-rotating turbomachine parts includes the step of measuring displacement of at least one turbomachine part. A monitoring step monitors displacement of the turbomachine part with a non-contact type sensor. A collecting step collects data regarding the displacement of the turbomachine part. An analyzing step analyzes the data to determine if the displacement exceeds a predetermined threshold range. The non-contact type sensor may be attached to the turbomachine by a rod formed of a material having a low coefficient of thermal expansion, and a target may be attached to a stationary structure in close proximity to the non-contact type sensor.

In another aspect of the present invention, a system for monitoring a non-rotating turbomachine part includes a non-contact type sensor located in close proximity to a target. The non-contact type sensor or the target is attached to the non-rotating turbomachine part by a rod formed of a material having a low coefficient of thermal expansion. The target or the non-contact type sensor is attached to a stationary structure located near the non-rotating turbomachine part. The stationary structure is substantially separate from the non-rotating turbomachine part. The non-contact type sensor measures displacement of the non-rotating turbomachine part.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment," "one aspect," or "an embodiment," or "an aspect" of the present invention are not intended to be interpreted as excluding the existence of additional embodiments or aspects that also incorporate the recited features.

Figure 1:
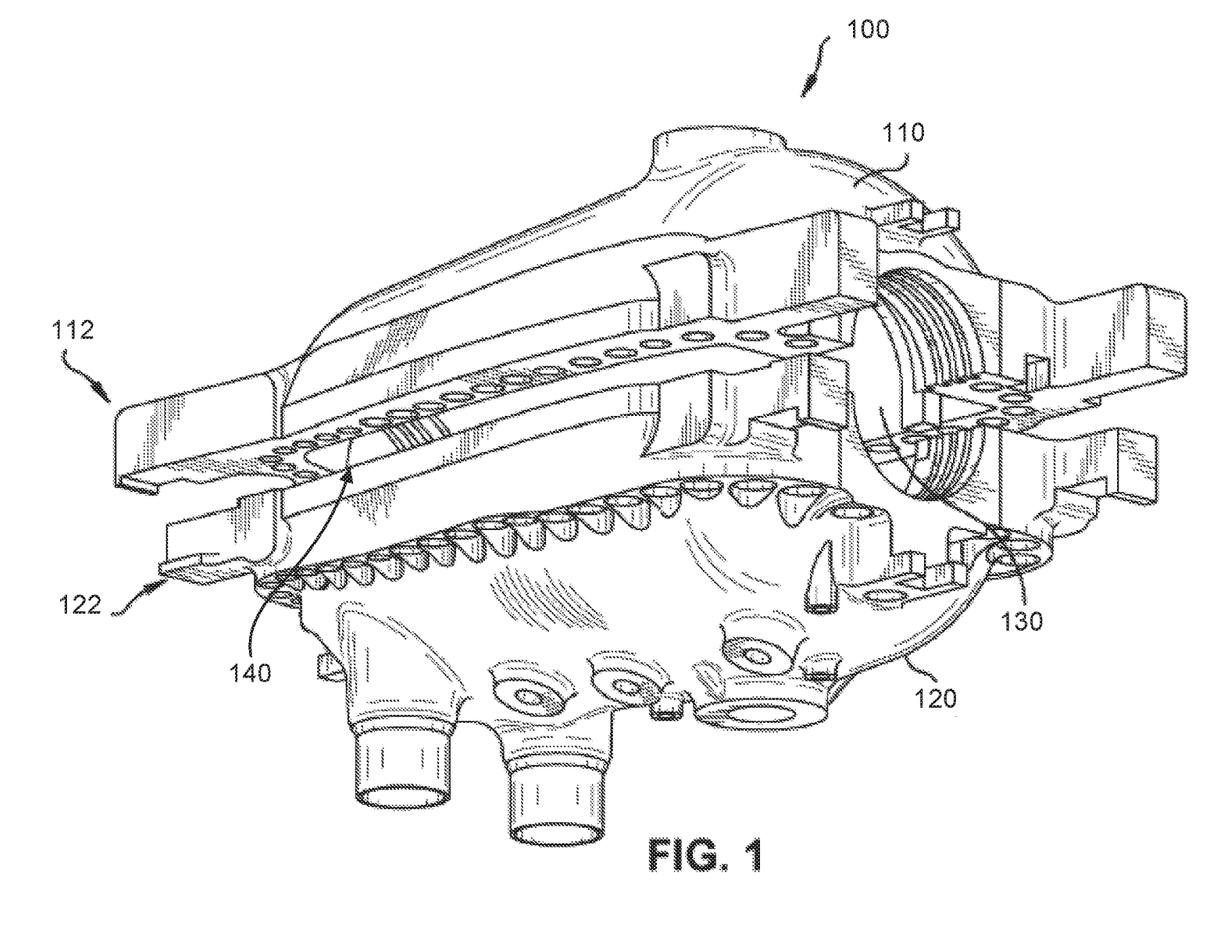
FIG. 1 illustrates an exploded perspective view of an upper and lower shell of a steam turbine.

FIG. 1 illustrates an exploded perspective view of an upper and lower shell of a steam turbine. A steam turbine is a turbomachine, but turbomachines also include gas turbines and compressors as well. The steam turbine shell 100 may be comprised of an upper shell 110 and a lower shell 120. Both shells, when affixed together, define a central cavity 130 that houses the rotor and stator components (not shown). The upper and lower shells are mechanically fastened together by bolting arm 112 of upper shell 110 to arm 122 of lower shell 120 together in a horizontal joint 140. When fully assembled, the shell 100 may be substantially encased in a thick layer of insulation, and many of the stationary or non-rotating turbomachine parts (such as the turbine shell, control/stop valves, steam turbine valves, piping, etc.) may also be encased in insulation. The insulation obscures the non-rotating or stationary parts, and this makes viewing and observation of these parts difficult.

Figure 2:
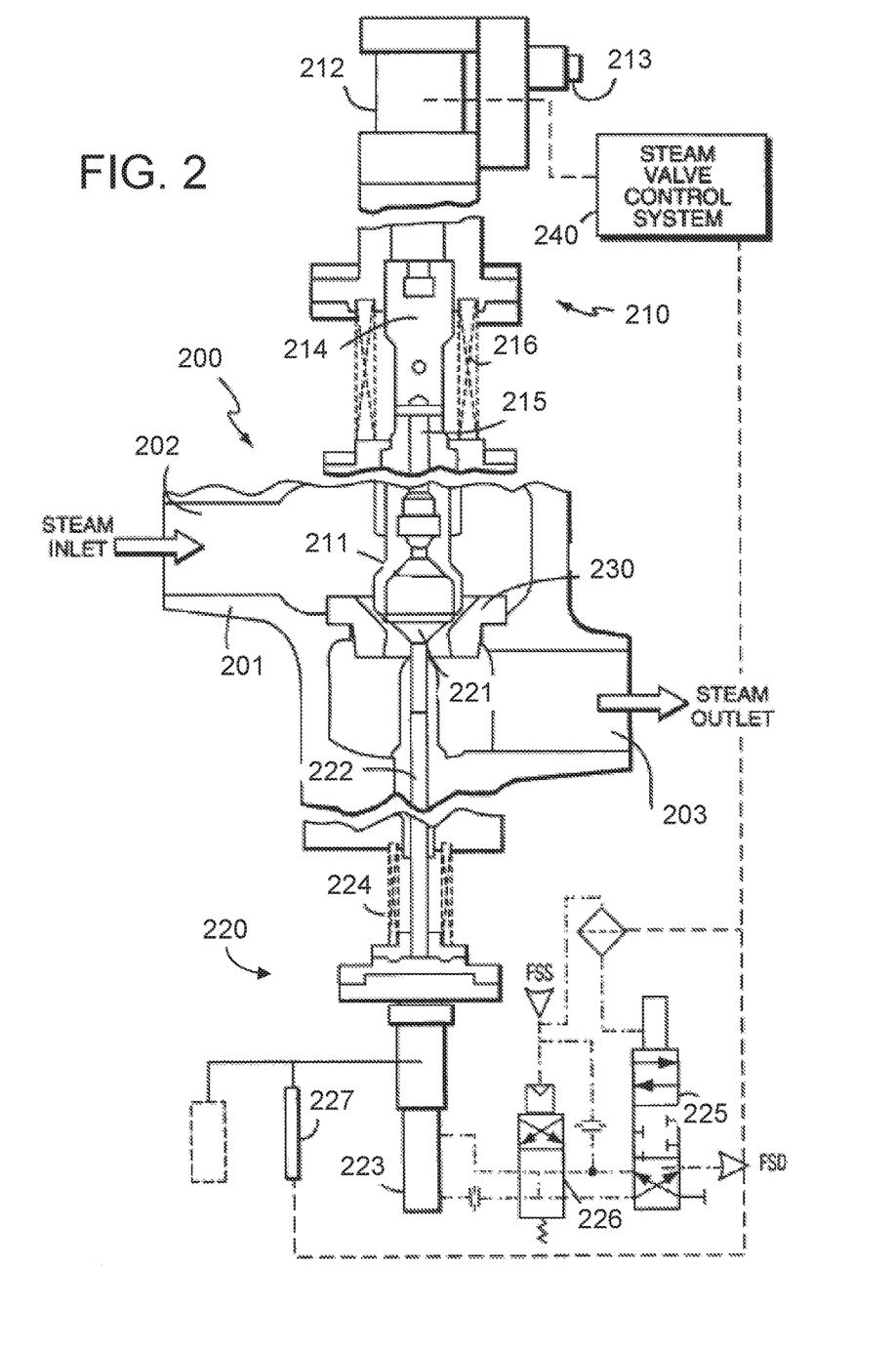
FIG. 2 illustrates a partial cross-sectioned view of a combined stop/control valve assembly.

FIG. 2 illustrates a partial cross-sectioned view of a combined stop/control valve assembly or steam turbine valve 200. The valve 200 has a steam valve body 201 with a steam inlet 202 and a steam outlet 203. Between the inlet 202 and outlet 203, there is provided a flow control valve 210 having a control valve disk 211, a stop valve 220 having a stop valve disk 221 and a valve seat 230. Above the flow control valve 210, there is provided a control valve actuator that includes a hydraulic cylinder 212 under the control of a servo valve 213 for supplying fluid to the cylinder 212 to raise and lower the control valve disk 211. The piston of the cylinder 212 is coupled to a cross head 214, in turn coupled to a vertical shaft 215 for raising the valve disk 211 against the bias of helical coil springs 216. The springs 216 are employed to fast-close the flow control valve 211 when the hydraulic fluid is dumped from cylinder 212 upon receiving a fast-close signal from a steam valve control system. Thus, it will be appreciated that by using the servo valve 213, the position of the flow control head 211 relative to the seat 230 can be controlled when load changes are made by the turbine. For example, if the turbine speed speeds up above normal, the control valve 210 will start to close off the steam flow between steam inlet 202 and steam outlet 203. Should a fast-close control signal be received from the control system, the servo valve dumps the hydraulic fluid and the spring 216 fast-closes the flow control valve 211 to close the valve between the steam inlet 202 and outlet 203.

The stop valve disk 221 is mounted on a stop valve stem 222, which extends through suitable packing to a hydraulic cylinder 223. Springs 224 are provided for biasing the stop valve disk 221 to a valve-closed position (i.e., to fast-close the stop valve). A servo valve 225 is provided for supplying hydraulic fluid to and from opposite sides of the piston of the hydraulic cylinder 223. Additionally, a fast-acting dump valve 226 is provided for dumping hydraulic fluid from the cylinder 223 in response to a fast-close signal from the steam valve control system. A transducer 227 is provided to sense the position of the stop valve and provide the sensed position to the steam valve control system 240. The control system includes a servo valve, not shown, for supplying fluid to and receiving fluid from the cylinder 212 for positioning the control valve disk 211 relative to seat 230. Position transducers on the control valve sense control valve position. The control system, in turn, controls the solenoid-actuated valve 225 to supply hydraulic fluid to the cylinder 223 to maintain the position of the stop valve disk 221 proportional to the position of the control valve disk 211, at least during anticipated periods of unstable flow through the valve. During turbine operations, the stop valve and control valve both start off in the fully-closed position. First, the stop valve is actuated to the fully-open position, such that the stop valve disk 221 and stop valve nut nest within the control valve disk 211. Subsequently, the control valve is slowly opened, which enables fluid to flow between control valve disk surface 302 and valve seat surface 230. The control valve can be positioned anywhere between fully-closed and fully-open, depending on the load requirement of the turbine.

Figure 3:
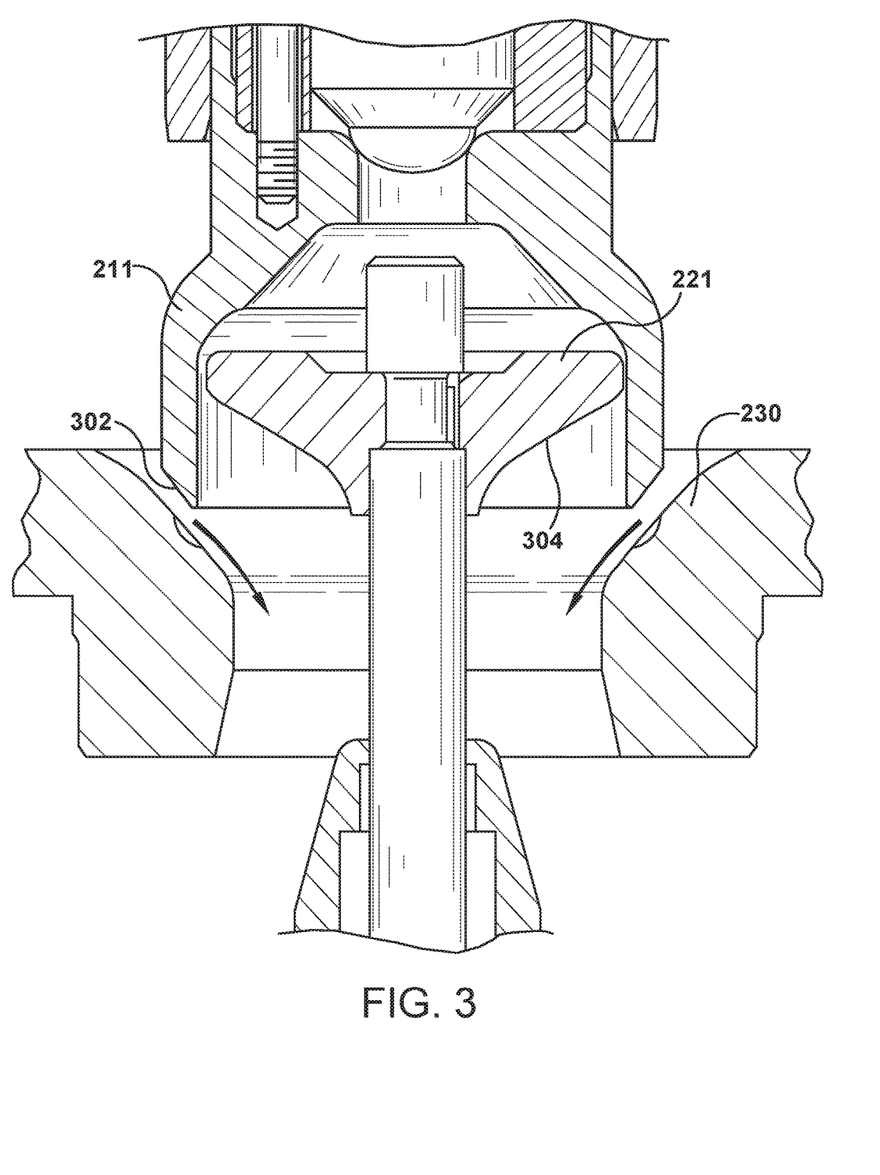
FIG. 3 illustrates an enlarged fragmentary cross-sectional view illustrating the flow control valve and stop valve in an intermediate valve-open condition.
Figure 4:
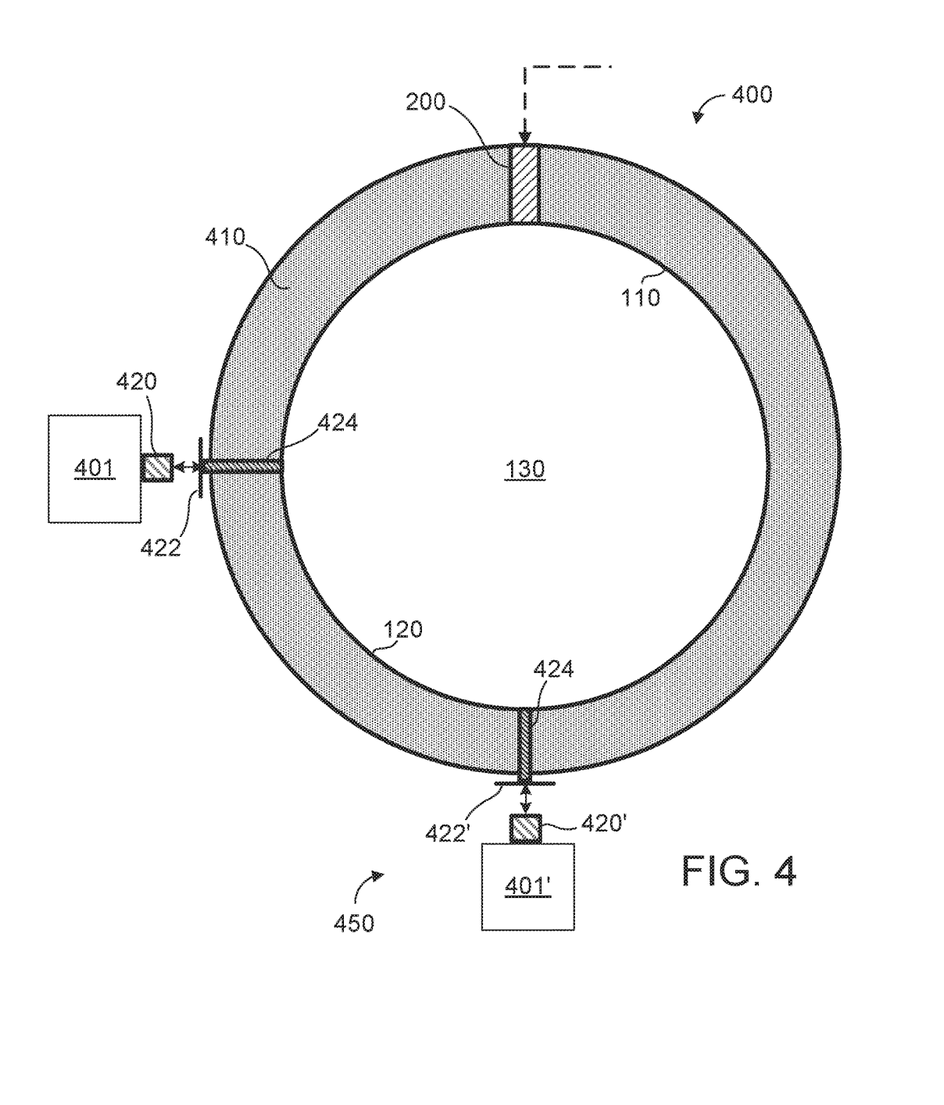
FIG. 4 is a simplified, cross-sectional schematic of a turbomachine, according to an aspect of the present invention.

FIG. 3 illustrates an enlarged fragmentary cross-sectional view illustrating the flow control valve 211 and stop valve 221 in an intermediate valve-open condition. FIG. 4 is a simplified, cross-sectional schematic of a turbomachine, such as a steam turbine. The turbomachine 400, has an outer shell 110, 120 (as described in conjunction with FIG. 1). The central cavity 130 contains the stator and rotor parts (not shown). The turbomachine 400 has insulation 410 placed over the turbomachine to reduce heat loss during machine operation. Typically, this insulation 410 may be quite thick and can substantially cover some or all of the stationary or non-rotating turbomachine parts. As stated previously, these stationary or non-rotating turbomachine parts may include the turbine shell 110, 120, steam turbine valve 200 (in steam turbine applications) shell flanges or shell arms, pipes, and any other suitable stationary/non-rotating part. From FIG. 4, it will be apparent that the steam turbine valve 200 (e.g., a control/stop valve) is entirely or substantially encased by the insulation 410, thereby making observation thereof impossible or at least very difficult. In like manner, the turbine shell 110, 120 is also obscured by the insulation 410, thereby making observation or monitoring thereof impossible or at least very difficult.

According to an aspect of the present invention, a system 450 for monitoring a stationary or non-rotating part of the turbomachine can be used to monitor the turbomachine in real-time for vibrations or displacements. The system includes a non-contact type sensor 420 located in close proximity to a target 422. Close proximity is defined as a suitable range between the sensor 420 and target 422. Non-limiting examples of this range may be about 1 inch to about 8 inches or more, but this range is specifically determined by the characteristics of the sensor 420. The target 422 may be attached to the turbomachine part (e.g., shell 110 or 120) by rod 424. The rod 424 is formed of a material having a low coefficient of thermal expansion, and extends through the insulation 410. The sensor 420 is attached to a stationary structure 401 located near the turbomachine part. For example, in the case where the turbomachine part is the turbine shell, the stationary structure 401 could be a nearby wall, pillar or any other support that is substantially separate from the turbine shell. The point here is that the stationary structure 401 should be substantially thermally independent from the turbomachine part, so that thermally and/or vibrationally induced machine displacements will not affect the nearby stationary support structure. In the example shown, the sensor 420, target 422 pair measure displacements in a horizontal radial direction. The sensor 420', target 422' pair measure displacements in a vertical radial direction. The two illustrated sensor/target pairs are deployed at or about 90 degrees from each other so that displacement of the turbine shell can be detected in two dimensions. Alternatively, the sensor 420 may be mounted on rod 424, and the target 422 mounted on the stationary support structure.

The non-contact type sensor 420 may be a displacement sensor that measures the distance between the sensor 420 and the target 422. As non-limiting examples, the sensor 420 may be a laser displacement sensor, a linear variable differential transformer (LVDT) sensor, a microwave sensor, a magnetic or inductive sensor, an optical sensor, laser sensor or any other suitable displacement or vibration measuring device. In the laser sensor example, laser light is emitted from the sensor 420 and reflected by the target 422 back to the sensor 420. Multiple reflective layers in the target 422 may be used to reflect multiple beams, and triangulation can be used to determine the distance between the sensor 420 and target 422. When this data is monitored in real time, accurate displacements of the turbomachine part can be determined and compared to predetermined values to detect if part displacements/vibrations are normal or if they exceed the desired range. If excessive part static displacement or vibration is detected, then this event could indicate part erosion, malfunction or undesired loading on the stationary/non-rotating turbomachine parts.

The rod 424 has a low coefficient of thermal expansion, to minimize its movement during heating so that the target 422 movement is primarily caused by shell 110, 120 movement alone. An example coefficient of thermal expansion for rod 424 is less than about 1.5 ppm/° C., when measured between 20° C. and 100° C., or between 20° C. and 2,000° C. Materials having such attributes are Invar, FENi36 or 64FeNi. Other materials may also be used for rod 424 if they exhibit suitably low coefficients of thermal expansion. Rod 424 should also be made of materials which can withstand high temperatures seen on the turbine shell exterior. The rod 424 is important in that it allows a direct connection between the turbomachine part and the sensor 420 (or target 422), and locates the sensor 420 outside of the insulation (or at least in direct line of sight with target 422).

The rods 424 and sensors 420 may be placed in multiple locations along turbine shell 110, 120, such as on the shell arms 112, 122, along the shell flanges or joint between upper and lower shells or on the steam turbine valves 200, or on any other desired stationary/non-rotating turbomachine part. The displacement sensors 420 may also be configured to pick up movement in three or more axes by orienting the sensors 420 and targets 422 to detect displacement in radial directions and axial directions. The axial direction would be in or out of the page in FIG. 4.

Figure 5:
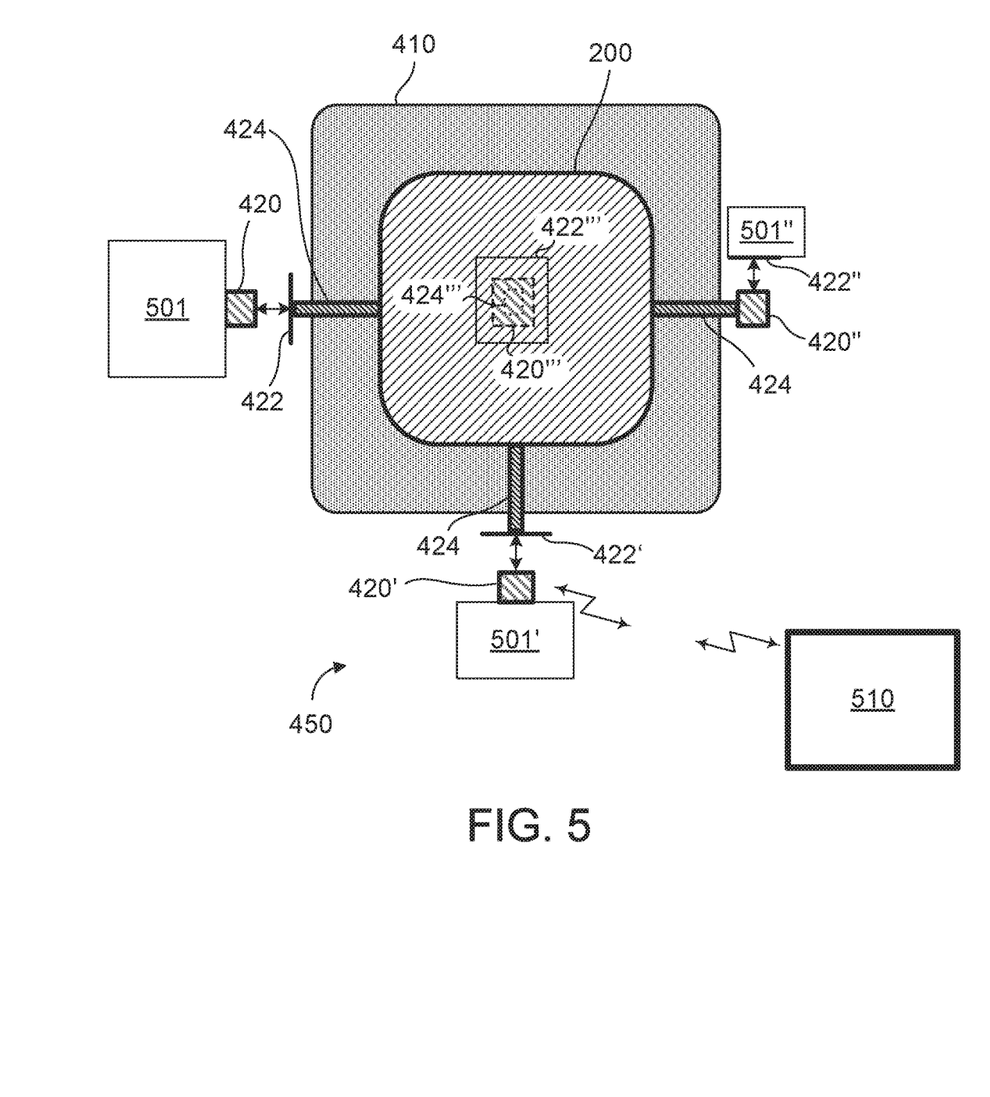
FIG. 5 illustrates a simplified schematic, top view of a steam turbine valve, such as a control/stop valve, according to an aspect of the present invention.

FIG. 5 illustrates a simplified schematic, top view of a steam turbine valve 200, such as a control/stop valve, according to an aspect of the present invention. Sensor 420 is attached to stationary structure 501, which may be a wall, pillar or any other suitable structure near the turbomachine. Sensor 420/target 422 pair measure displacement and/or vibration in a horizontal radial axis. Sensor 420'/target 422' and sensor 420" (mounted to rod 424) and target 422" (mounted to stationary structure 501") pairs measure displacement and/or vibration in a vertical radial axis. Sensor 420''' and target 422''' pair measure displacement and/or vibration in the axial axis. This example shows three axes being monitored, but additional axes may be monitored by angling additional sensors/targets in other directions, for example a 45 degree angle between the radial and axial axes, or a 45 degree angle between the vertical radial and horizontal radial axes. Sensor and target pairs can also be positioned to measure movement of individual valve components such as the control valve stem, stop valve stem, valve casing, etc. by measuring movement of external surfaces. Similarly, internal component movement of valve stems, disks, etc. can be measured by installing a small, high temperature rated, optically-transparent window (e.g. sapphire) on the valve casing, which passes laser light.

The plurality of non-contact type sensors 420 may transmit displacement/vibration data to a control system 510. The transmission may be via a wired or wireless link. The control system may be located at the same site as the turbomachine, or the control system 510 may be located remotely. The control system will analyze, determine and/or report an alarm if the displacement (or vibration) exceeds a predetermined threshold range. For example, if the control/stop valve 200 is experiencing erosion, then it may begin to vibrate beyond the normal expected range, and in this case this excessive displacement/vibration would be detected by the sensors 422 and control system 510 would determine that the control/stop valve 200 is experiencing a potential problem or may malfunction. The sensors 420 and the targets 422 may also be in alternate locations. The targets 422 could be mounted on the rods 424, while the sensors 420 are attached to the stationary structures 501, as shown by target 422' and sensor 420'.

Figure 6:
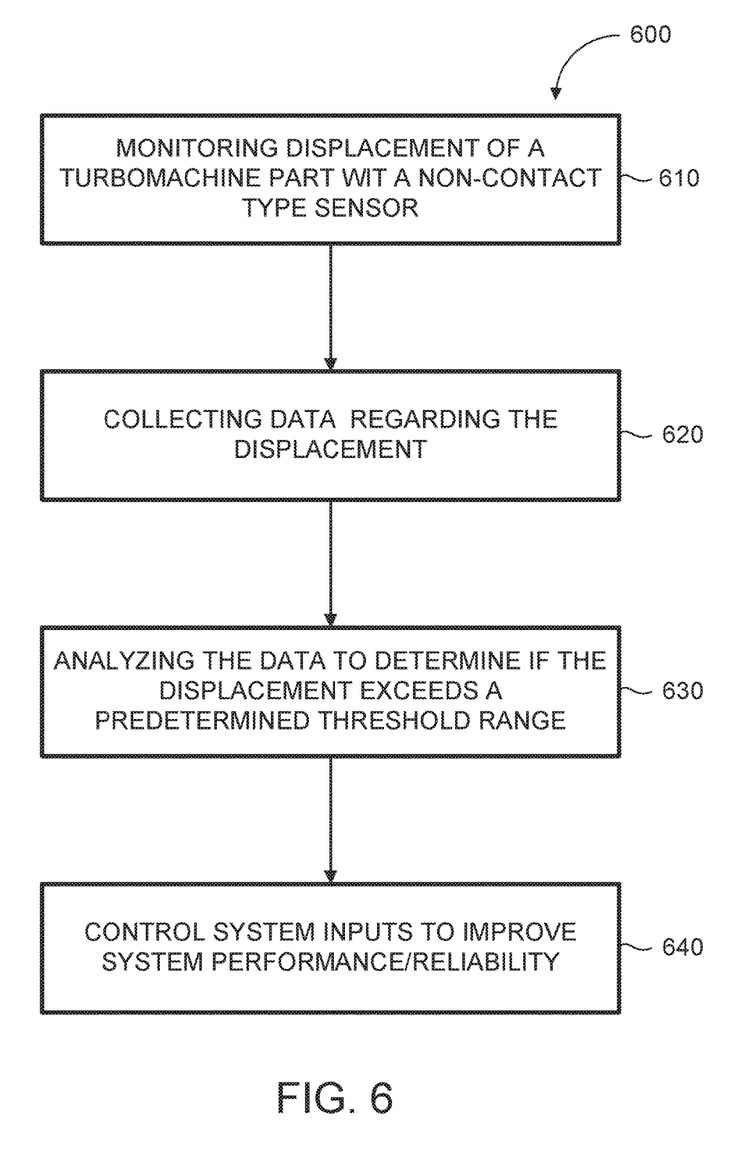
FIG. 6 is a flowchart of a method for monitoring non-rotating or stationary turbomachine parts, according to an aspect of the present invention.

FIG. 6 is a flowchart of a method 600 for monitoring non-rotating or stationary turbomachine parts, according to an aspect of the present invention. A measuring method measures the displacement of at least one turbomachine part and includes the following steps. A monitoring step 610 monitors displacement of the turbomachine part with a non-contact type sensor 420. The monitoring may occur in real-time during machine operation, and/or at regularly scheduled intervals. The sensor 420 may be a laser sensor, a linear variable differential transformer (LVDT) sensor, a microwave sensor, a magnetic sensor, or an optical sensor. A collecting step 620 collects data regarding the displacement of the turbomachine part (e.g., a turbine shell or turbine valve). An analyzing step 630 analyzes the data to determine if the displacement exceeds a predetermined threshold range. If the data does indicate excessive displacement or vibration, the control system can display a warning or alarm that notifies an operator of the condition of the turbomachine part. A control step 640 then adjusts system operation to improve performance and/or reliability.

The system 450 may be used to monitor changes in the static and dynamic displacements/movement of the stationary/non-rotating turbomachine part relative to a fixed position enabling real time evaluations of the stationary/non-rotating turbomachine part movements for all operational and nonoperational conditions for the turbomachine. Evaluations to be performed may be insulation quality, clearance assessments, and hot and cold loads being applied to the turbomachine. This system also can be used to diagnose and compliment difficult rotor train vibration issues by providing vibration characteristics of the stationary/non-rotating turbomachine parts in real time to go along with shaft vibration data, which can facilitate pinpointing the source, location, and or cause of vibration. In addition to the diagnostic capabilities this invention could be used to feed an analytical model (i.e., a digital twin) that would enable optimized starting and loading of the turbomachinery with respect to reliability, availability, etc.

Complex installation issues related to pipe loading which effects the cold position of the unit can be diagnosed with system 450. This invention can validate whether or not pipe loads meet or exceed requirement and set a baseline for the turbine. Excessive pipe loading during installation may result in vibration issues during commissioning of a turbine. This invention can pinpoint the exact location of where a pipe load might be out of tolerance and can direct a technician to the exact pipe and exact location that needs to be adjusted. The present invention may also be used to solve or determine the root cause or source of Balance of Plant (BOP) related vibration issues when coupled with current rotating equipment proximity probes by providing complimentary dynamic displacement content at multiple locations on the stationary/non-rotating components. Movements of the stationary/non-rotating parts can be tracked, monitored and compared to established baselines to determine if changes in loadings or insulation are improving or degrading over time which would enable predictive and or condition based maintenance to be performed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for monitoring non-rotating turbomachine parts, the method comprising:
   measuring displacement of at least one non-rotating turbomachine part, the measuring comprising:
   (a) monitoring displacement of the non-rotating turbomachine part with a non-contact type sensor, the non-contact type sensor comprising one of, a laser sensor, a magnetic sensor or an optical sensor;
   (b) collecting data regarding the displacement of the non-rotating turbomachine part;
   (c) analyzing the data to determine if the displacement exceeds a predetermined threshold range.

2. The method of claim 1, wherein the non-contact type sensor is attached to the non-rotating turbomachine part by a rod formed of a material having a low coefficient of thermal expansion, and a target is attached to a stationary structure in close proximity to the non-contact type sensor.

3. The method of claim 2, the material having a coefficient of thermal expansion less than about 1.5 ppm/° C., when measured between 20° C. and 2,000° C.

4. The method of claim 2, the material comprising Invar, FeNi36 or 64FeNi.

5. The method of claim 2, the non-contact type sensor comprising the laser sensor.

6. The method of claim 1, wherein a target is attached to the non-rotating turbomachine part by a rod formed of a material having a low coefficient of thermal expansion, and the non-contact type sensor is attached to a stationary structure in close proximity to the target.

7. The method of claim 6, the material having a coefficient of thermal expansion less than about 1.5 ppm/° C., when measured between 20° C. and 2000° C.

8. The method of claim 6, the material comprising Invar, FeNi36 or 64FeNi.

9. The method of claim 1, the non-rotating turbomachine parts being a steam turbine shell or a steam turbine valve.

10. The method of claim 1, wherein two non-contact type sensors or two targets are attached to the non-rotating turbomachine part and are deployed about 90 degrees from each other so that displacement of the non-rotating turbomachine part is detected in two dimensions.

11. A system for monitoring a non-rotating turbomachine part, the system comprising:
   a non-contact type sensor located in close proximity to a target, either the non-contact type sensor or the target attached to the non-rotating turbomachine part by a rod formed of a material having a low coefficient of thermal expansion, the non-contact type sensor comprising one of a laser sensor, a magnetic sensor or an optical sensor;
   the target or the non-contact type sensor is attached to a stationary structure located near the non-rotating turbomachine part, the stationary structure being substantially separate from the non-rotating turbomachine part; and
   wherein the non-contact type sensor measures displacement of the non-rotating turbomachine part.

12. The system of claim 11, the material having a coefficient of thermal expansion less than about 1.5 ppm/° C., when measured between 20° C. and 2,000° C.

13. The system of claim 11, the material comprising Invar, FeNi36 or 64FeNi.

14. The system of claim 11, the non-contact type sensor comprising the laser sensor.

15. The system of claim 11, the non-rotating turbomachine part being a steam turbine shell or a steam turbine valve.

16. The system of claim 11, wherein the rod is configured to extend through insulation placed over the turbomachine part so that the non-contact type sensor has unobstructed line-of-sight to the target.

17. The system of claim 11, wherein two non-contact type sensors or two targets are attached to the non-rotating turbomachine part and are deployed about 90 degrees from each other so that displacement of the non-rotating turbomachine part is detected in two dimensions.

18. A method for monitoring non-rotating turbomachine parts, the method comprising:
   measuring displacement of a non-rotating turbomachine part, the measuring comprising:
   (a) monitoring displacement of the non-rotating turbomachine part with a non-contact type sensor, the non-contact type sensor comprising a laser sensor;
   (b) collecting data regarding the displacement of the non-rotating turbomachine part;
   (c) analyzing the data to determine if the displacement exceeds a predetermined threshold range; and
   wherein the non-rotating turbomachine part is a steam turbine shell or a steam turbine valve.

19. The method of claim 18, wherein the non-contact type sensor is attached to the non-rotating turbomachine part by a rod formed of a material having a low coefficient of thermal expansion, and a target is attached to a stationary structure in close proximity to the non-contact type sensor.

20. The method of claim 19, the material having a coefficient of thermal expansion less than about 1.5 ppm/° C., when measured between 20° C. and 2,000° C.

21. The method of claim 19, the material comprising Invar, FeNi36 or 64FeNi.

22. The method of claim 18, wherein a target is attached to the non-rotating turbomachine part by a rod formed of a material having a low coefficient of thermal expansion, and the non-contact type sensor is attached to a stationary structure in close proximity to the target.

23. The method of claim 22, the material having a coefficient of thermal expansion less than about 1.5 ppm/° C., when measured between 20° C. and 2000° C.

24. The method of claim 22, the material comprising Invar, FeNi36 or 64FeNi.

25. The method of claim 18, wherein two non-contact type sensors or two targets are attached to the non-rotating turbomachine part and are deployed about 90 degrees from each other so that displacement of the non-rotating turbomachine part is detected in two dimensions.

\* \* \* \* \*